Figure 3:
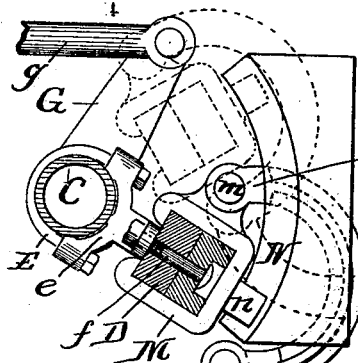

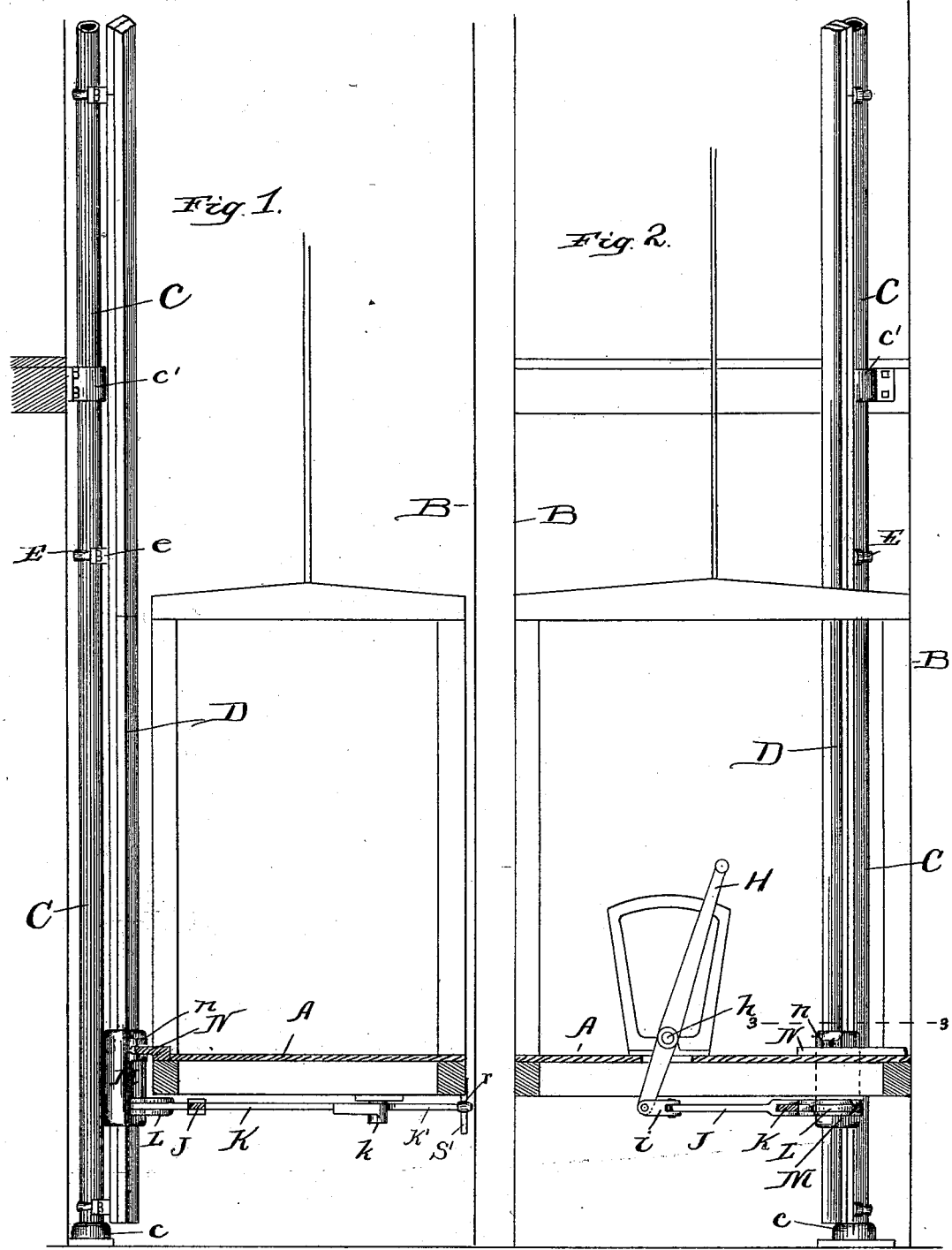

(No Model.) 2 Sheets—Sheet 2.

T. W. EATON.
CONTROLLING MECHANISM FOR ELEVATORS.

No. 508,510. Patented Nov. 14, 1893.

Witnesses:
Lew. C. Curtis
Emma Hack

Inventor:
Thomas W. Eaton
By Munday Evarts & Adcock
His Attorneys.

THE NATIONAL LITHOGRAPHING COMPANY,
WASHINGTON, D. C.

UNITED STATES PATENT OFFICE.

THOMAS W. EATON, OF CHICAGO, ILLINOIS, ASSIGNOR TO THE EATON & PRINCE COMPANY, OF SAME PLACE.

CONTROLLING MECHANISM FOR ELEVATORS.

SPECIFICATION forming part of Letters Patent No. 508,510, dated November 14, 1893.

Application filed September 27, 1892. Serial No. 447,043. (No model.)

*To all whom it may concern:*

Be it known that I, THOMAS W. EATON, a citizen of the United States, residing in Chicago, in the county of Cook and State of Illinois, have invented a new and useful Improvement in Controlling Mechanism for Elevators, of which the following is a specification.

This invention relates to that class of controlling devices for elevators wherein the movement of a lever in the car is transmitted to the operating mechanism of the engine or motor through a vertical shaft located in the hoistway and extending from top to bottom thereof, the lever being so connected to said shaft as to maintain a running hold thereon.

In the constructions heretofore used a shaft of some form other than round and capable of a partial rotation has usually been employed, in conjunction with a slide or sleeve moving with the car and traversing the shaft, the slide or sleeve being connected to the lever upon the car by mechanism suitable to cause a rotary movement by the slide when the lever was actuated, and the partial rotation of the shaft being due to this movement of the slide and the irregular form of the shaft, much as the turning of a nut is due to its form and the motion given the wrench encircling it. In some cases the shaft has been made round with a groove or key-seat running its entire length, the slide having a key engaging such groove or seat. These constructions are subject to very serious difficulties: First, the shaft must be practically in one piece, or if of more than one, the parts must be joined without increasing the size at the points of jointure. Second, it must be finished for its entire length to allow the sleeve to pass at all points and not be loose at any. Third, the intermediate bearings must greatly reduce the size of the shaft at the points where they are located so that the sleeve can pass them, or else the bearings must be adapted to move out of the way of the slide and resume their positions after it has passed, both of which constructions are highly objectionable. Added to these difficulties is the fact that the slide moving over the shaft and depending upon the angular form or projections of the parts for its ability to rotate the shaft, is liable to wear down the angles or projections so as to allow so much lost motion as to render the apparatus inoperative. The first cost of these old constructions has combined with the objections mentioned to practically exclude them from use. In one instance also the shaft has been made angular in form and, instead of being supported at its ends, is supported wholly upon laterally projecting arms secured to it at intervals between its ends and hinged independently of each other at stationary points along in the hoist way. In this construction the shaft is not rotated, but is swung on the arms by the car lever.

In this invention I avail myself of the best features of both of these old constructions, my object being to overcome the difficulties pertaining to the old constructions, and to produce an apparatus which is cheap in its first cost, efficient in action, and not liable to such wear as will impair its efficiency and durability. To accomplish this result, I employ the rotating shaft not as a way for the slide, but only as a means for transmitting movement to the valve or other operating mechanism and as a means for supporting a vertical bar placed along side of the shaft and serving as a way for the slide. The bar is joined to the shaft at proper intervals by suitable horizontal arms, and the necessary parts of its surface are left unobstructed so that the slide may move past the arms without encountering them. The bar really acts as a handle whereby to turn the shaft, and both it and the shaft may be made in a very inexpensive manner.

Thus the bar may be made of wood, of any convenient form, and bolted to the outer ends of the arms. I prefer to make it square and the slide preferably conforms to the shape of the bar. The shaft is perhaps most conveniently made of wrought iron pipe the lengths of which can be screwed or coupled together with outside couplings, if need be, until the required length is obtained, and the joints may be screwed up tight enough so that they will not unscrew in transmitting the power. It is only necessary that the pipe be sufficient in diameter and strength of metal to prevent torsion and springing. The bearings of the shaft may be located wherever convenient and be as numerous as necessary. The arms may be of any desired construction, but I prefer that they encircle the shaft and be adapted to be tightened thereon so as to avoid slipping. The slide is, preferably, connected to the operating device upon the car by a curved link so that the power applied to the slide is a direct push or pull in the direction movement is desired, instead of the objectionable twisting strain which is a feature of previous constructions.

The invention consists in the novel construction of devices and combinations of devices hereinafter set forth and claimed.

Figure 7:
Figure 8:
Figure 9:
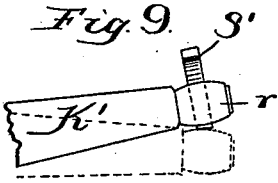
Figure 4:
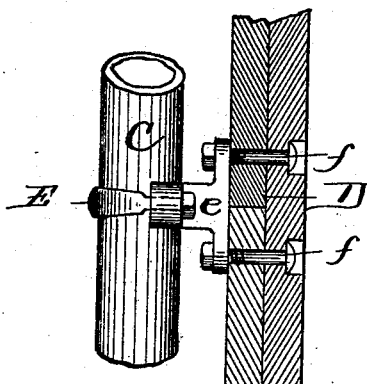
Figure 5:
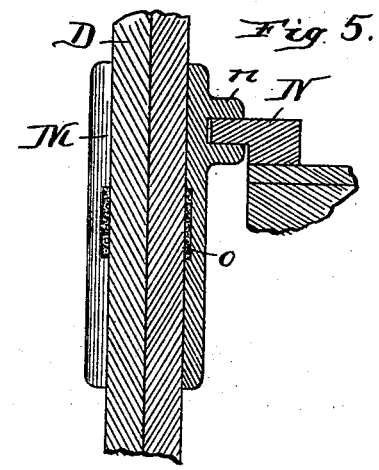
Figure 6:
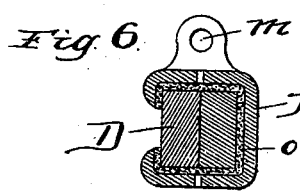

In the accompanying drawings Figures 1 and 2 are each vertical sections of the elevator car, one section being taken at right angles to the other. Fig. 3 is a partial horizontal section upon the line 3—3 of Fig. 2. Fig. 4 is a vertical section of the swinging vertical bar showing the manner of supporting it from the oscillating shaft. Fig. 5 is a vertical section of the bar and the sliding sleeve which traverses it, and by which the running hold is maintained. Fig. 6 is a horizontal section of the parts shown at Fig. 5. Figs. 7 and 8 show the inclines for stopping the car at the ends of its run, and Fig. 9 shows one of the cams and the lever operated by it.

In the drawings A represents an elevator car or cage, moving in the usual manner along the guide ways B. Adjacent to the path of the car and extending the length of the hoistway is a vertical shaft C stepped at the bottom as shown at $c$ and supported at intervals along the hoistway by bearings $c'$. This shaft is, preferably, made of metal pipe and is capable of a partial rotation or oscillation. Parallel with the shaft C and also extending from top to bottom of the hoistway is a swinging bar D preferably made of wood and joined to the shaft C at suitable intervals by appropriate bracket devices, such for instance as the straps E encircling the shaft and having their ends secured in blocks $e$, and bolts $f$ securing the blocks to the bar.

At G is a crank secured to the shaft C and connected by a lever or pitman $g$ to the device which controls the motor of the elevator, or to mechanism leading to and transmitting movement to said device. I do not illustrate either the device or the power transmitting mechanism employed to operate it except said crank and lever, inasmuch as those portions of the elevator mechanism have no bearing upon my present invention.

The elevator car is provided with a system or arrangement of levers whereby a horizontal application of power is made to the bar D which tends to swing said bar and thereby to oscillate the shaft and operate the motor controlling device. This lever system may be constructed as follows:—H is a hand lever projecting above the floor of the car and adapted to be operated by the attendant. It is pivoted at $h$ and extends below the floor where it is joined to a link $i$, and this link is connected by the rod J to a lever K pivoted to the floor of the car at $k$ and standing at right angles to the rod J. A curved arm L extends from the swinging end of lever K and is joined at $m$ to the farther side of a sliding sleeve M traversing the bar D. This sleeve does not completely encircle the bar, being open at one side to avoid interference with the supporting devices of the bar. The sleeve is compelled to move with the car by the constant engagement with the lugs $n$ upon the sleeve of a curved plate N borne upon the car as plainly illustrated at Figs. 3 and 5. The arm L is attached to the farther side instead of the front or the near side of the sleeve in order that the power by which the bar is swung may be advantageously applied thereto.

It will be seen from the description above given that when the attendant swings the lever H, power will be transmitted from said lever to the sleeve which will tend to force the bar in a lateral direction and thereby to oscillate the shaft C with its resultant actuation of the motor controlling device.

By means of the sleeve and the other devices described a constant or running hold is maintained upon the bar D so that the attendant is able to move the controlling device in any position of the car, and the movement is instantaneous and without the lost motion commonly met with in the use of cable mechanism.

A packing $o$ is desirably placed around the interior surface of the sleeve and serves as a means of evenly distributing the lubricant employed to ease the movements of the sleeve. The packing is made of some absorbent material like felt which will absorb and hold the lubricant.

My controlling mechanism may also be employed in automatically stopping the car at the ends of its run. For this purpose I station near the top of the hoistway an inclined cam S and near the bottom a reversely inclined cam $S'$ with each of which the short arm $K'$ of lever K will come in contact and by which said lever will be actuated so as to swing the bar D in such direction as to insure a stoppage of the motor. The end of arm $K'$ is preferably provided with a roller $r$ to lessen the friction caused by the contact with the cams. These cams of course bring the swinging bar to its central position.

It will be noticed that the vertical shaft and bar being rigidly joined together by arms or brackets located at suitable intervals throughout their length, form in effect a rigid frame pivoted in the bearings of the shaft and adapted to be swung sidewise by power applied to the bar through the mechanism upon the car.

I claim—

1. The combination with the car and means for transmitting motion to the mechanism for controlling the elevator motor, of a continuous vertical shaft having freedom to turn in its bearings, a continuous vertical bar located parallel to and supported from said shaft by rigid connections essentially as described, and devices upon the car having a running hold upon the bar and adapted to swing the same at will, substantially as specified.

2. The combination with the car and means for transmitting motion to the mechanism for controlling the elevator motor, of a continuous vertical shaft having freedom to turn in its bearings, a continuous vertical bar located parallel to and supported from said shaft by rigid connections essentially as described, and devices upon the car having a running hold upon the bar and adapted to push and pull the bar sidewise and thus cause it to swing, substantially as specified.

3. In an elevator, a vertical pivoted and sidewise swinging frame, consisting of the vertical shaft and bar placed parallel to each other and joined rigidly together at suitable intervals, in combination with means for transmitting motion from the frame to the controlling device of the elevator motor, means upon the car for swinging the frame, and said car, substantially as specified.

4. In combination with the car and means for transmitting motion to the mechanism for controlling the motor thereof, of the vertical shaft mechanically connected to said controlling devices, the vertical bar rigidly joined to the shaft, devices upon the car having a running hold upon the bar and adapted to swing the same at will, and means for swinging said bar automatically at the end of the car's run, substantially as set forth.

5. In combination with the car and means for transmitting motion to the mechanism for controlling the motor thereof, of the vertical shaft mechanically connected to said controlling devices, the vertical bar rigidly joined to the shaft, devices upon the car having a running hold upon the bar and adapted to swing the same at will, and a cam adapted to automatically operate the device by which the bar is swung when the car reaches the end of its run, substantially as set forth.

6. The combination with the car and the bar adapted to swing extending vertically along the hoistway, of the lever K, curved arm L, sleeve M, and a hand device for operating lever K, substantially as specified.

7. The combination with the vertical rock shaft, the vertical bar D supported thereby and adapted to swing sidewise, of the slide traversing said bar, the curved arm L joined to the slide and serving to impart the sidewise movement to the bar, and levers for actuating said arm, substantially as specified.

THOMAS W. EATON.

Witnesses:
EDW. S. EVARTS,
EMMA HACK.